United States Patent
Kao

(10) Patent No.: US 6,439,079 B1
(45) Date of Patent: Aug. 27, 2002

(54) BICYCLE HANDLE STAKE WITH DOUBLE LOCKING PORTIONS

(76) Inventor: Cheng-Hsien Kao, 2, Alley 1, Lane 29, Sec. 2, Pei-Shin Rd., Shin-Tien City, Taipei Hsien (TW)

( * ) Notice: Subject to any disclaimer, the term of this patent is extended or adjusted under 35 U.S.C. 154(b) by 0 days.

(21) Appl. No.: 09/543,098

(22) Filed: Apr. 4, 2000

(51) Int. Cl.[7] ............................................. B62K 21/12
(52) U.S. Cl. ..................................................... 74/551.8
(58) Field of Search ........................... 74/551.1–551.8, 74/551.9; 403/385, 389; 188/24; 280/88, 263, 264

(56) References Cited

U.S. PATENT DOCUMENTS

| | | | | |
|---|---|---|---|---|
| 593,471 A | * | 11/1897 | Heaton | 74/551.2 |
| 626,602 A | * | 6/1899 | Fenton | 74/551.2 |
| 4,026,165 A | * | 5/1977 | Papp | 74/551.1 |
| 5,881,606 A | * | 3/1999 | Roddy | 74/551.1 |
| 6,035,741 A | * | 3/2000 | Krizman, Jr. | 74/551.8 |
| 6,192,773 B1 | * | 2/2001 | Liao | 74/551.3 |

FOREIGN PATENT DOCUMENTS

| | | | | |
|---|---|---|---|---|
| FR | 325192 | * | 4/1903 | 74/551.1 |
| FR | 505878 | * | 10/1919 | 74/551.1 |
| FR | 794122 | * | 2/1936 | 74/551.8 |
| FR | 857732 | * | 9/1940 | 74/551.1 |

* cited by examiner

Primary Examiner—Chong H. Kim
(74) Attorney, Agent, or Firm—Varndell & Varndell, PLLC

(57) ABSTRACT

A bicycle handle stake with double locking portions combines a handle and an auxiliary handle. The outer surface of a handle stake of the bicycle is expanded with a main tube body and a second tube body, the main tube body and the second tube body have a respective locking portion for being locked by the handle and the auxiliary handle of a bicycle. Therefore, the handle and auxiliary handle of a bicycle are combined and can be assembled easily and conveniently.

1 Claim, 3 Drawing Sheets

BICYCLE HANDLE STAKE WITH DOUBLE LOCKING PORTIONS

FIELD OF THE INVENTION

The present invention relates to a bicycle handle stake with double locking potions, wherein the front end of the handle stake in a bicycle is biforked so as to be formed as an upper and a lower locking portion for locking the handle and an auxiliary handle in the bicycle. Therefore, the assembly work of a bicycle is reduced, and the cost is reduced.

BACKGROUND OF THE INVENTION

In the prior art bicycle, as an auxiliary handle is further assembled, two sets of handle joints are necessary to connect the auxiliary handle and the handle. Therefore, more components are necessary and much working time is required so that the cost in finishing is increased and thus it is uneconomic.

SUMMARY OF THE INVENTION

Accordingly, the primary object of the present invention is to provide a bicycle handle stake with double locking potions, especially a stake structure for combining the handle and the auxiliary handle. The outer surface of a handle stake of the bicycle is extended with a main tube body and a secondary tube body, the main tube body and the secondary tube body have a respective locking portion for being locked by the handle and an auxiliary handle of a bicycle. Therefore, the handle and auxiliary handle of a bicycle are combined by the present invention. Thus, the assembly work of the auxiliary handle can be complete rapidly without needing any other handle combining components. Therefore, it can be assembled easily and conveniently, and thus the manufacturing cost is reduced greatly.

The various objects and advantages of the present invention will be more readily understood from the following detailed description when read in conjunction with the appended drawing.

DETAILED DESCRIPTION OF THE PREFERRED EMBODIMENTS

Figure 1:
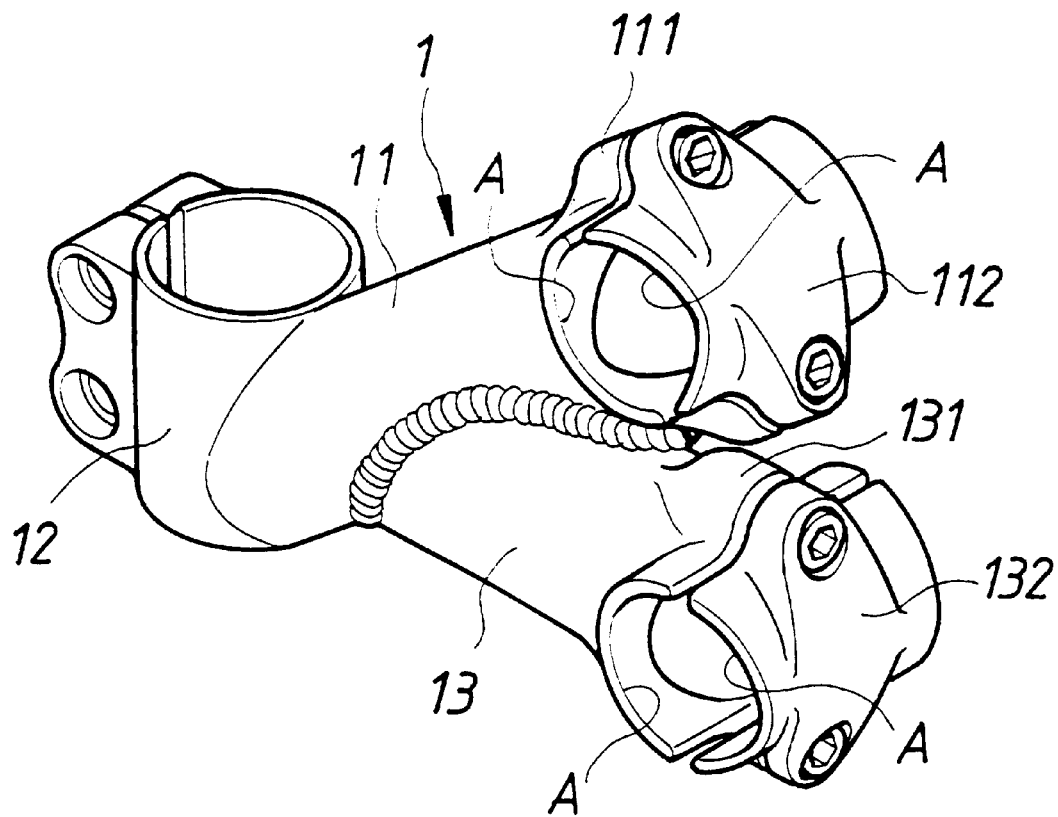
FIG. 1 is a perspective view of the present invention.

With reference to FIG. 1, the bicycle handle stake with double locking potions of the present invention is illustrated therein. The handle stake 1 has a tube shape. The stake is extended with a main tube body 11 and a secondary tube body 13. The rear end of the main tube body 11 has a upright circle combining end 12 so that thereby, the handle stake 1 can be locked to the upper end of the front biforked tube of a bicycle. Moreover, the front end of the main tube body 11 of the handle stake 1 is shaped with a locking portion 111. The front surface of the locking portion 111 is formed with a concave cambered surface A. By a locking cover 112 with the concave cambered surface A, they are locked with one another. The aforesaid secondary tube body 13 and the main tube body 11 are formed as a biforked tube body. The front end thereof is also formed with a locking portion 131. The front surface of the locking portion 131 is formed with a concave cambered surface A. The front end thereof is disposed with a locking portion 131 and the front end of the locking portion 131 is disposed with a concave cambered surface A. A locking cover 132 with a concave cambered surface A at the inner side thereof is locked to the correspondent locking portion 131.

Figure 2:
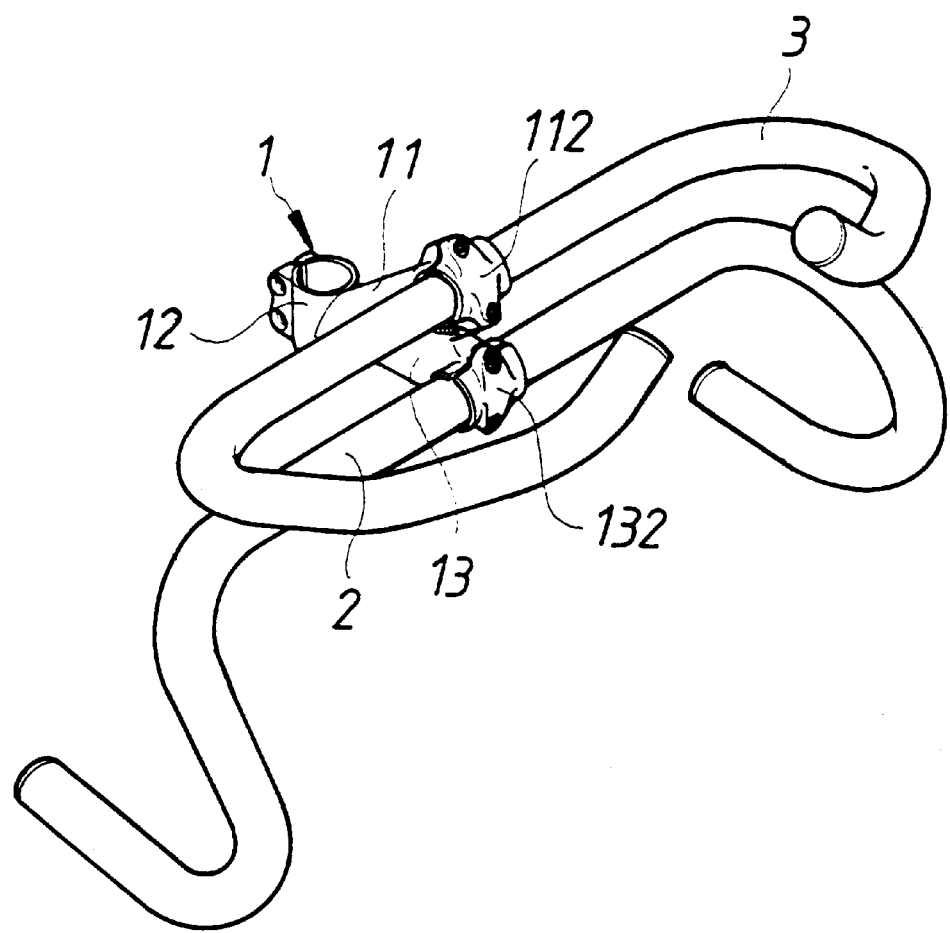
FIG. 2 shows an application embodiment of the present invention.

As shown in FIG. 2, the bicycle handle 2 and the auxiliary handle 3 are located in the front concave cambered surfaces A of the main tube body 11 and the secondary tube body 13. By the locking of the locking covers 112 and 132, they are tightly positioned.

Figure 3:
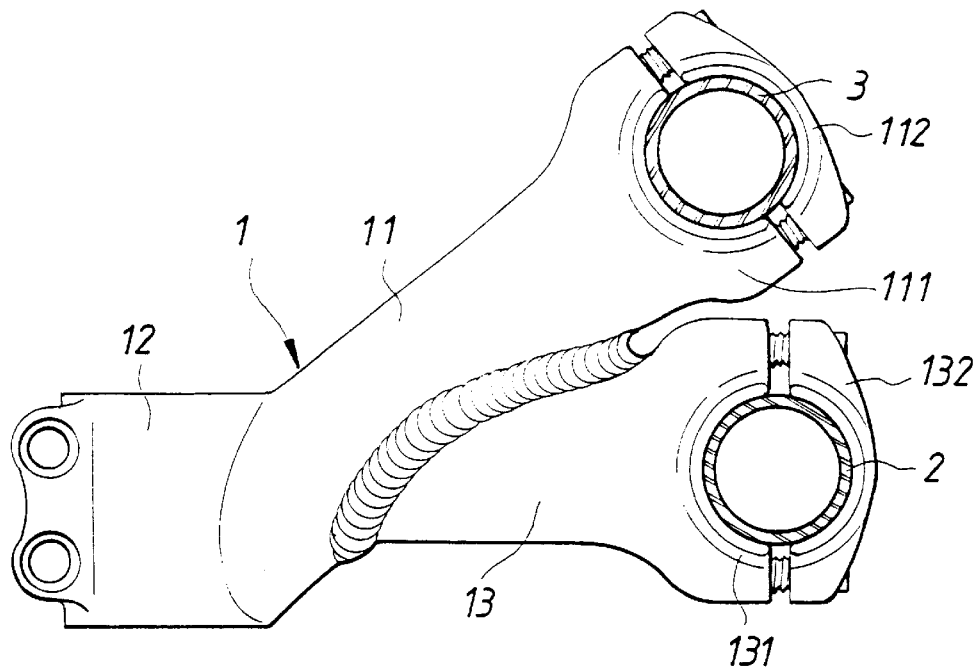
FIG. 3 is an embodiment showing that the main tube body and the secondary tube body are welded.
Figure 4:
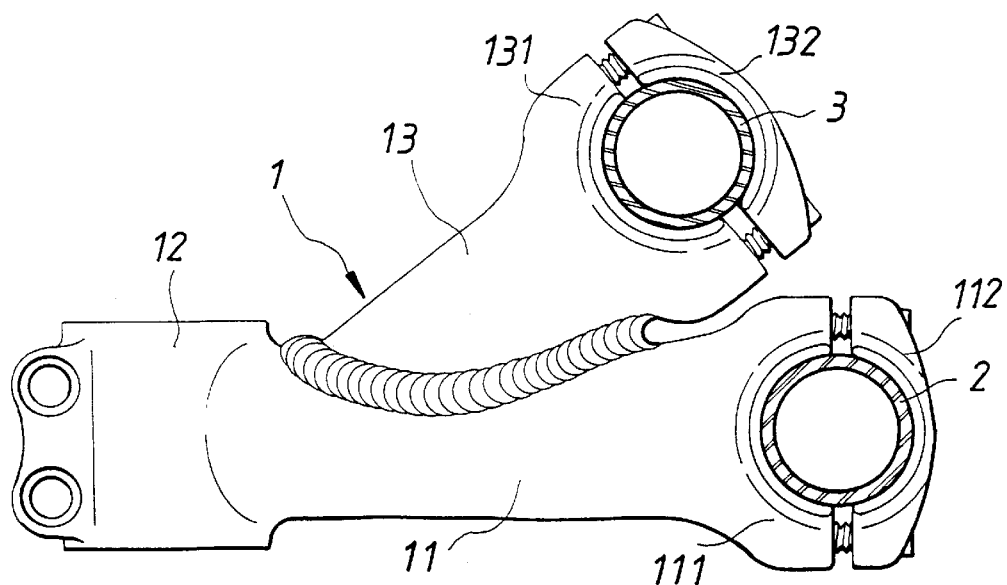
FIG. 4 is another embodiment showing that the main tube body and the secondary tube body are welded.

As shown in FIG. 3, the secondary tube body 13 can be installed at the upper or lower surface of the main tube body 11 (as shown in FIG. 4) dependent on the orientation of the main tube body 11. If the orientation of the main tube body 11 is tilted upwards, then the secondary tube body 13 is flatly installed at the lower surface of the main body tube 11. On the contrary, if the main tube body 11 is installed horizontally, then the secondary tube body 13 is installed at the upper surface of the main tube body. A proper clamping angle is retained between the main tube body 11 and the secondary tube body 13. Therefore, when the handle 2 and the auxiliary handle 3 are assembled, the locking portions 111 and 131 of the tube bodies do not interfere with one another.

Further, the bicycle handle stake with double locking potions of the present invention is primarily used to combine the handle 2 with an auxiliary handle 3 of a bicycle, so that the locking portions 111 and 131 at front ends of the main tube body 11 and the secondary tube body 13 can have any structure, such as a general C-shape. Similarly, the upright cyclic combining end 12 (or collar) can be replaced by an inserting type combining rod to achieve the object of fixing the handle stake. Moreover, other than by welding, the secondary tube body 13 can be made by forging or integrally formed in another way.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A bicycle handle stake with first and second locking portions, which comprises an upright collar for securing the bicycle hand stake to a front fork tube of bicycle, a primary tube body having one end joined to said collar and a second end terminating in said first locking portion, a secondary tube having a side and an end secured to a side of said primary tube, said secondary tube extending from a back end portion of said primary tube adjacent said collar and substantially along a side of said primary tube and toward said first locking portion, said primary tube having a length longer than that of said secondary tube, said secondary tube terminating in a second locking portion, said first and second locking portions respectively having a concave cambered surface at a front surface thereof, and said cambered surfaces are locked by a respective locking cover with a corresponding concave cambered surface for securing a handle and an auxiliary handle to the bicycle hand stake.

* * * * *